United States Patent
Delmas et al.

(10) Patent No.: US 6,578,920 B2
(45) Date of Patent: Jun. 17, 2003

(54) VEHICLE SEAT HAVING A SEAT PROPER OF ADJUSTABLE HEIGHT

(75) Inventors: Stéphane Delmas, Flers (FR); Pascal Noiseau, Flers (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 13 days.

(21) Appl. No.: 09/876,483

(22) Filed: Jun. 7, 2001

(65) Prior Publication Data

US 2002/0060488 A1 May 23, 2002

(30) Foreign Application Priority Data

Jun. 9, 2000 (FR) .............................. 00 07433

(51) Int. Cl.⁷ ................................. A47C 1/02
(52) U.S. Cl. ................................. 297/344.17
(58) Field of Search ...................... 297/344.12, 344.13, 297/344.1, 344.15, 344.17

(56) References Cited

U.S. PATENT DOCUMENTS

| 4,515,339 A | 5/1985 | Klüting et al. |
|---|---|---|
| 4,577,730 A | 3/1986 | Porter |
| 4,729,539 A * | 3/1988 | Nagata |
| 4,782,715 A | 11/1988 | Chevance |
| 5,217,195 A | 6/1993 | Tanaka et al. |
| 5,626,395 A * | 5/1997 | Aufrere |
| 5,709,364 A * | 1/1998 | Araki et al. |
| 6,347,778 B1 * | 2/2002 | Koga et al. |

FOREIGN PATENT DOCUMENTS

| FR | 2 132 930 | 11/1972 |
|---|---|---|
| FR | 2 495 911 | 6/1982 |
| FR | 2 624 451 | 6/1989 |
| GB | 2 324 719 | 11/1998 |

OTHER PUBLICATIONS

Search Report issued by the French Patent Office for parent French Application No. 00 07433 filed on Jun. 9, 2000; report dated Feb. 19, 2001.

* cited by examiner

Primary Examiner—Milton Nelson, Jr.
(74) Attorney, Agent, or Firm—Marshall, Gerstein & Borun

(57) ABSTRACT

A vehicle seat comprising a back and a seat proper which includes a rigid frame supported by a raising mechanism for moving the seat upwards or downwards, the raising mechanism being controlled by an actuator which comprises a tube provided with a nut and a screw which co-operates with the nut, the screw being provided with a free end situated inside the tube, the raising mechanism further comprising an elastically-deformable member for assisting the motor of the actuator. The elastically-deformable member is housed inside the tube of the actuator between the free end of the screw and a support element secured to the actuator tube.

11 Claims, 7 Drawing Sheets

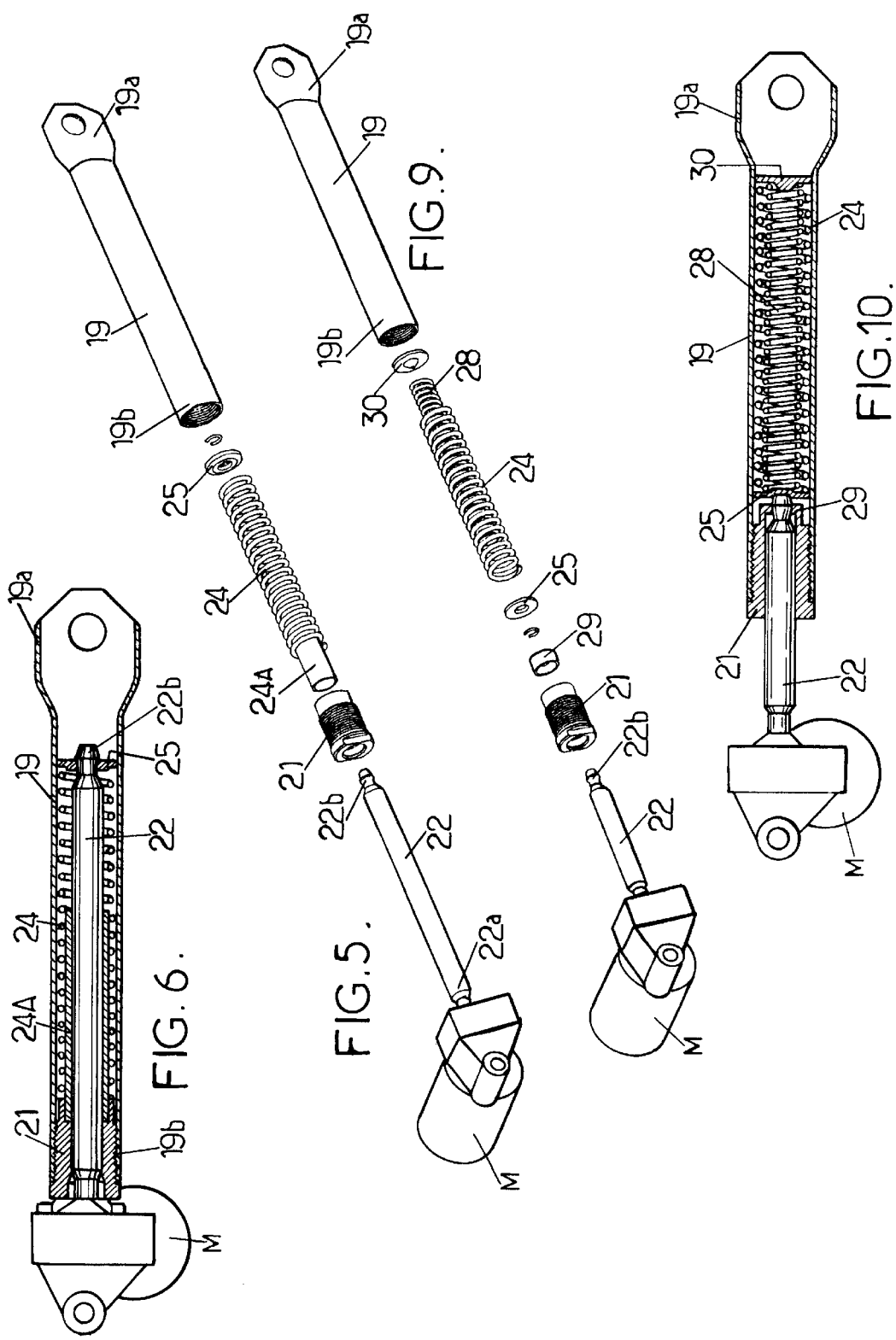

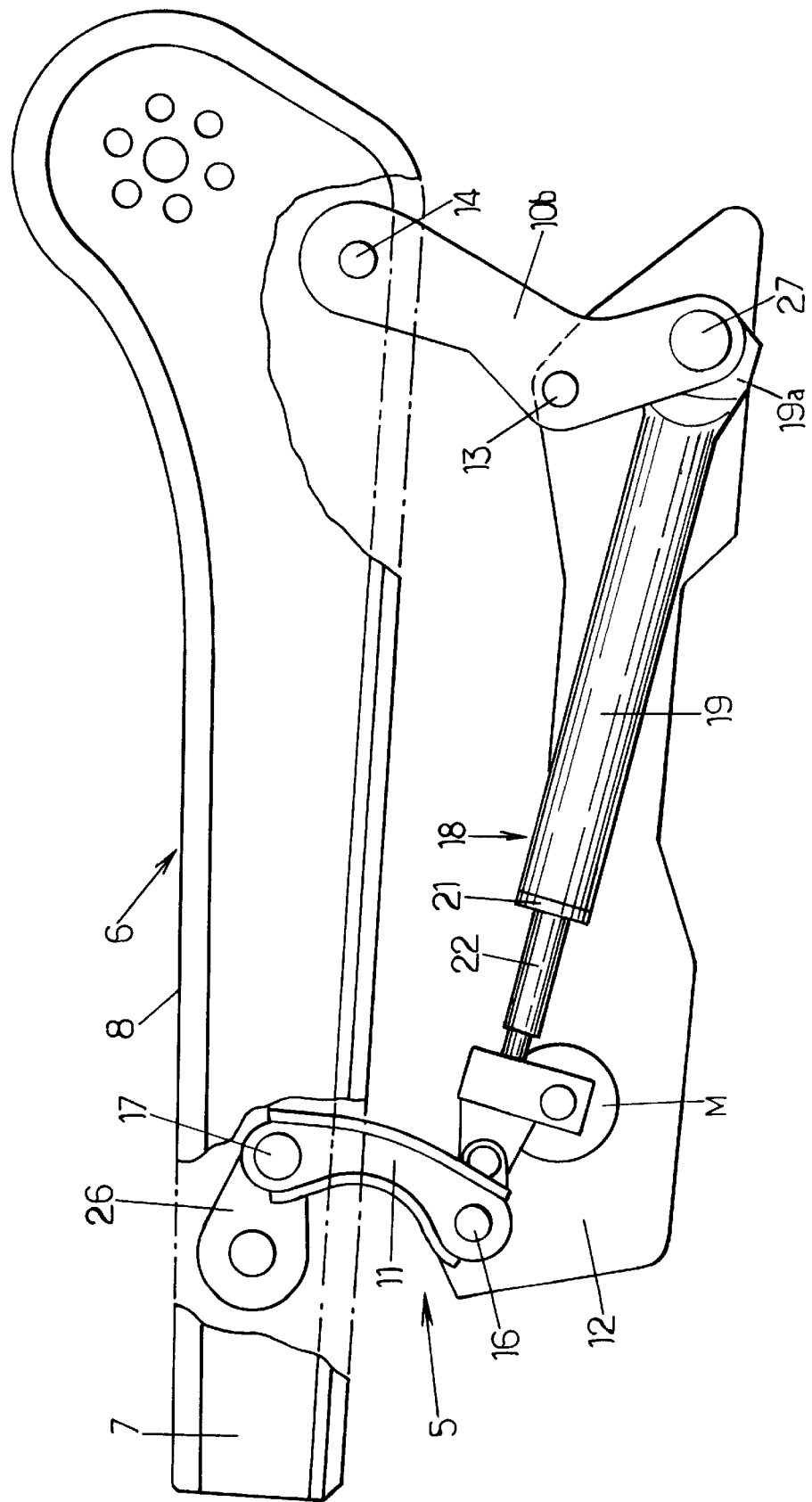

VEHICLE SEAT HAVING A SEAT PROPER OF ADJUSTABLE HEIGHT

BACKGROUND OF THE INVENTION

The present invention relates to vehicle seats in which the height of the seat proper is adjustable.

More particularly, amongst such vehicle seats, the invention relates to those comprising a vehicle seat comprising a back and a seat proper which extends in a longitudinal direction between a rear end close to the back and a front end remote from the back, said seat proper comprising a rigid frame supported by a raising mechanism for moving the seat proper upwards or downwards. Such seats are known in particular from U.S. Pat. No. 4,782,715. The raising mechanism is controlled by an actuator comprising a tube having a nut fixed at one end thereof and having a screw rotated by a motor and co-operating with the nut, the screw of the actuator being provided with a free end situated inside the tube of the actuator, the raising mechanism further comprising an elastically-deformable member for assisting the motor of the actuator while moving the rigid frame upwards.

In that known type of vehicle seat, the elastically-deformable member is generally constituted by a helical spring which exerts a traction force on certain portions of the raising mechanism, in particular on pivots, in order to urge the seat proper, or more precisely the rigid frame of the seat proper, upwards. The helical spring which is placed at a distance from the actuator thus serves to assist the actuator while moving the rigid frame upwards.

Nevertheless, since the helical traction spring is dimensioned to compensate substantially for the average weight of a user sitting on the seat, it will be understood that the spring thus generates large forces within the raising mechanism. Given the fact that the spring is generally located close to one side of the seat proper and that the actuator is generally located close to the other side thereof, these large forces give rise to deformation of the frame of the seat proper, thus causing friction in the pivots and consequently losses in the efficiency of the motor-driven actuator.

Similarly, the dimensions of the spring make it complicated to mount on the raising mechanism and the bulk of said spring makes it necessary to place the actuator at a distance therefrom, thus making it impossible to adjust accurately the clearance which exists between the screw of the actuator and the nut secured to the tube.

Finally, the traction spring can also be caused to vibrate, in particular when the vehicle is running or because of vibration from the engine, with the traction spring then transmitting the vibration to the moving part of the raising mechanism and thus to the entire rigid frame of the seat.

An object of the invention is to remedy the above-mentioned problems.

SUMMARY OF THE INVENTION

The invention acheives this object by the facts that the elastically-deformable member is housed inside the tube of the actuator between the free end of the screw of the actuator and a support element secured to the tube of the actuator.

Thus, the elastically-deformable member is directly integrated in the actuator so that the forces it exerts are no longer located on the moving part of the raising mechanism, but inside the actuator, thus making it possible advantageously to eliminate all axial play between the nut and the screw of the actuator and vibration phenomena on the raising mechanism. Furthermore, integrating the elastically-deformable member in the actuator makes it possible to provide a single module that is compact can that can be mounted directly on the raising mechanism so as to assist the motor of the actuator while it is moving the rigid frame of the seat upwards.

In preferred embodiments of the invention, use can also be made of one or more of the following dispositions:

- the elastically-deformable member operates in compression to urge the free end of the screw away from the support element;
- the raising mechanism comprises at least four links distributed as a pair of front links and a pair of rear links, which links pivot in vertical planes parallel to the longitudinal direction when the raising mechanism is in operation, the two links of each pair of links being supported respectively by bottom pivots sharing common pivot axes, the bottom pivots being connected to supports for connecting to the floor of the vehicle, and these two links being connected respectively to the rigid frame via top pivots which likewise share common pivot axes, said actuator having a first end connected to one of the links of the raising mechanism and a second end connected to the support;
- the actuator is designed to work in retraction during upward displacement of the rigid frame, and the support element is constituted by the nut of the actuator tube, the elastically-deformable member being disposed in an annular housing defined by the screw of the actuator and the tube of the actuator, and said elastically-deformable member being compressed between the nut of the tube and the free end of the screw of the actuator;
- the actuator is provided with an abutment member for limiting the stroke of the actuator screw during downward displacement of the rigid frame;
- the abutment member is constituted by a tubular member placed in the annular housing and surrounding a portion of the actuator screw, the tubular member having a first end connected to the nut of the tube and a second end for coming into contact with the free end of the actuator screw;
- the actuator is designed to operate in extension during upward movement of the rigid frame, and the support element is constituted by an end wall of the tube co-operating with the free end of the actuator screw to define a cylindrical housing in which the elastically-deformable member is disposed;
- the free end of the actuator screw includes an abutment member for coming into abutment against the nut of the actuator tube;
- the elastically-deformable member is constituted by a compression spring; and
- an additional compression spring is placed in the cylindrical housing concentrically with the first compression spring.

BRIEF DESCRIPTION OF THE DRAWINGS

FIG. 5 is an exploded perspective view of the actuator shown in FIGS. 3 and 4;

FIG. 6 is a section view of the FIG. 5 actuator in the assembled state;

FIG. 7 is a side view of a variant embodiment of the vehicle seat, the rigid frame being shown in its high position;

FIG. 9 is an exploded perspective view of the actuator shown in FIGS. 7 and 8; and FIG. 10 is a section view of the FIG. 9 actuator when in the assembled state.

MORE DETAILED DESCRIPTION

In the various figures, the same references are used to designate elements that are identical or similar.

Figure 1:
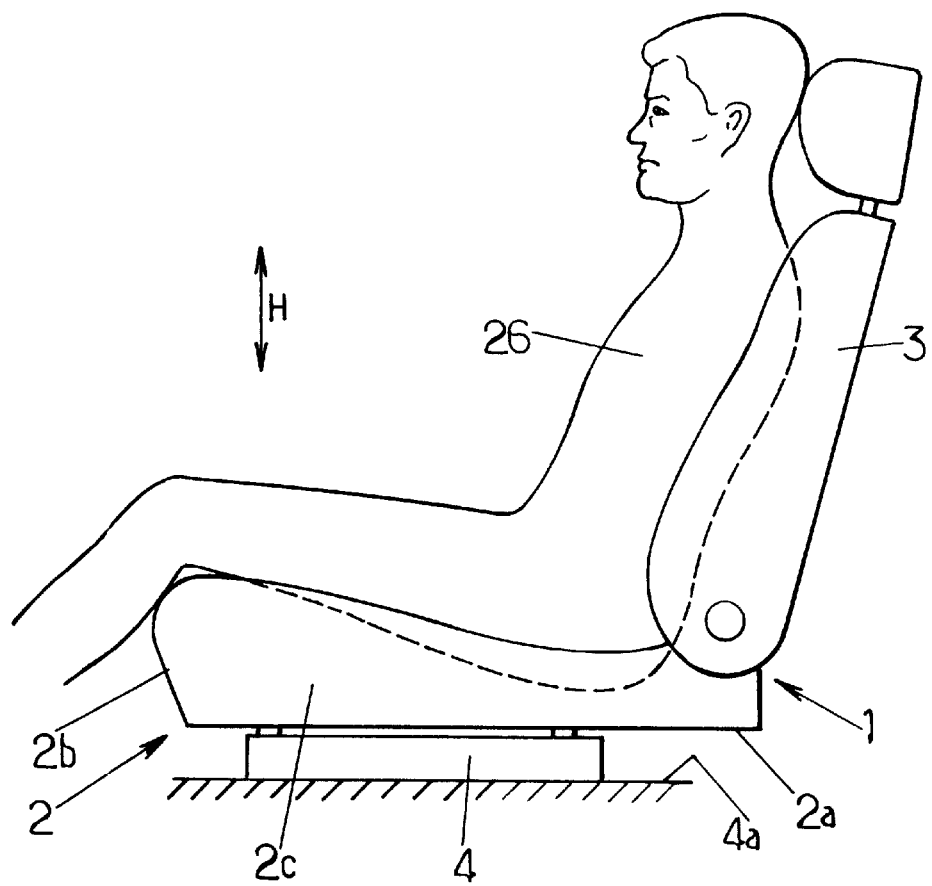
FIG. 1 is a diagrammatic side view of a seat fitted with an actuator of the invention.

As shown diagrammatically in FIG. 1, the invention relates to a vehicle seat 1, in particular a motor vehicle front seat.

The seat comprises firstly a seat proper 2 which extends in a "longitudinal" direction between a rear end 2a and a front end 2b, and secondly a back 3 which is generally pivotally mounted relative to the seat proper 2.

The seat proper 2 is supported by a raising mechanism 5 (FIG. 2) which can be mounted on longitudinal runners 4 which are themselves fixed to the floor 4a of the vehicle. In this way, the position of the seat can be adjusted both longitudinally in a forward or rearward direction by sliding along the runners 4, and also vertically by being raised or lowered in the vertical direction H.

The seat proper 2 mainly comprises a cushion 2c which is generally supported by a substantially horizontal suspension sheet which is placed in the center of a rigid frame 6, itself extending substantially horizontally. In the example shown in the figures, the rigid frame 6 comprises:

a front beam 7;

two side plates 8 integral with the front beam 7; and a rear metal tube 9 fixed to the rear ends of the two side plates 8 of the frame 6.

Figure 2:
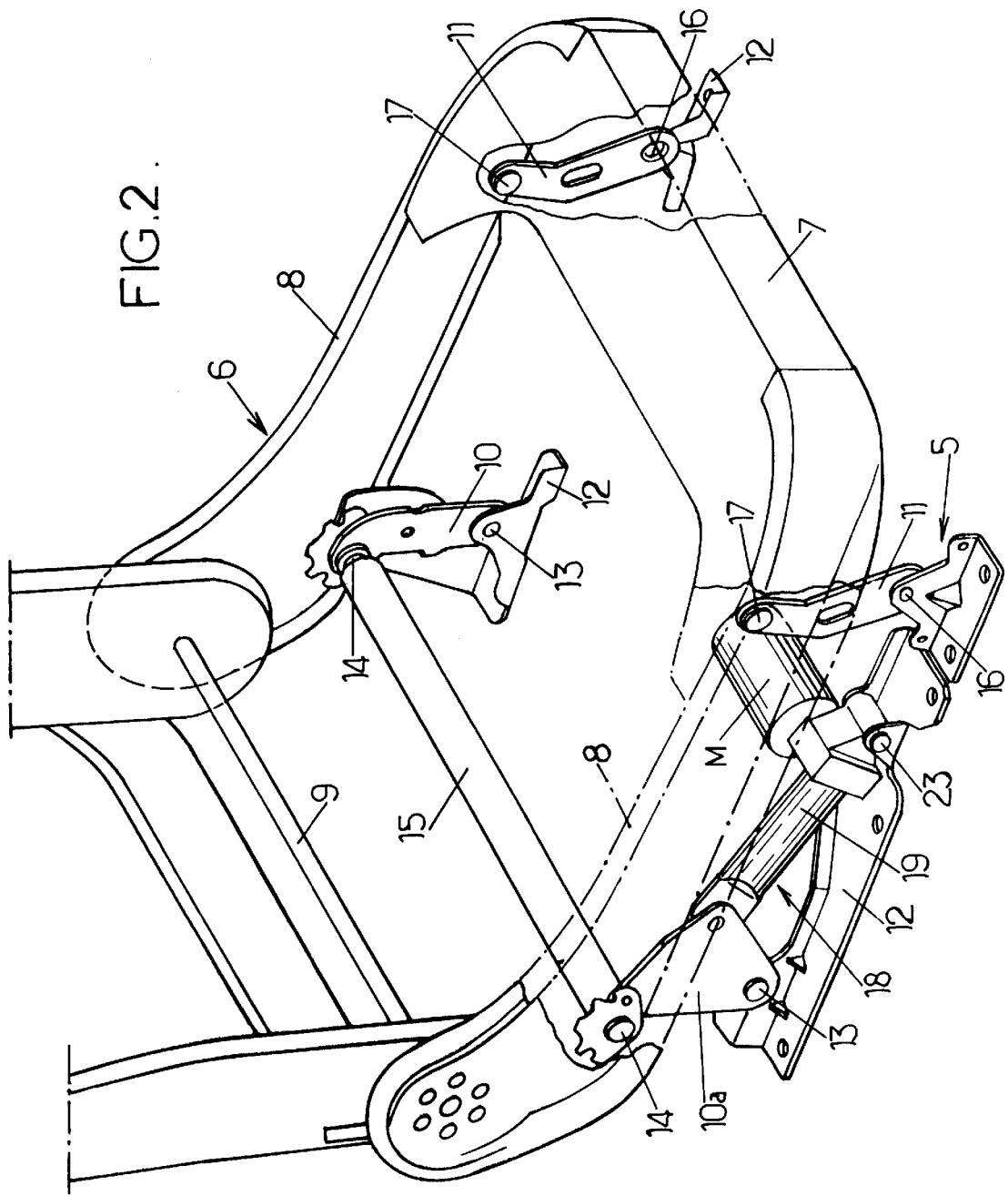
FIG. 2 is a perspective view of the rigid frame of a seat in accordance with the invention, the rigid frame being in its high position.
Figure 3:
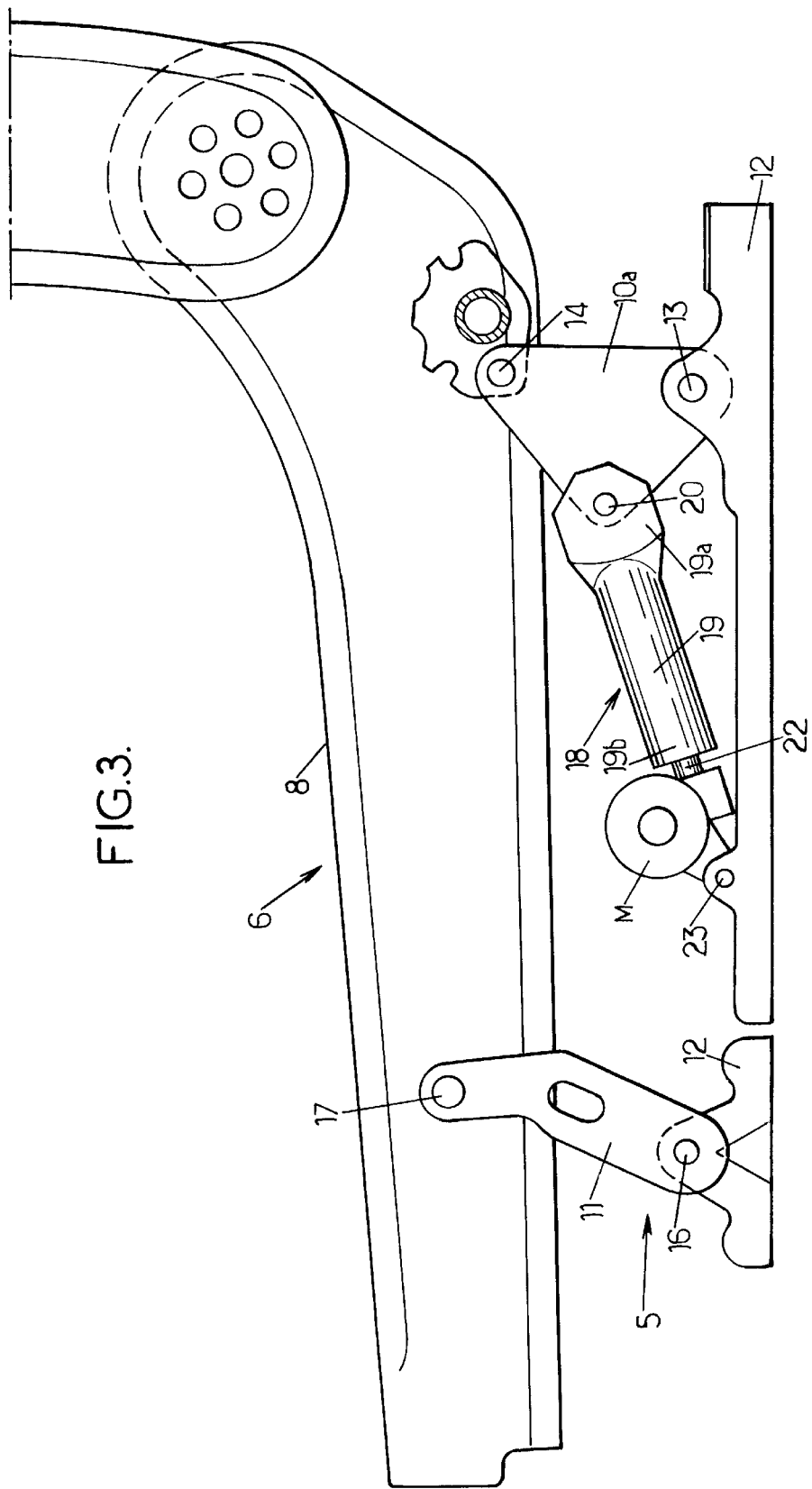
FIG. 3 is a side view of the FIG. 2 seat, the rigid frame being in its high position.
Figure 4:
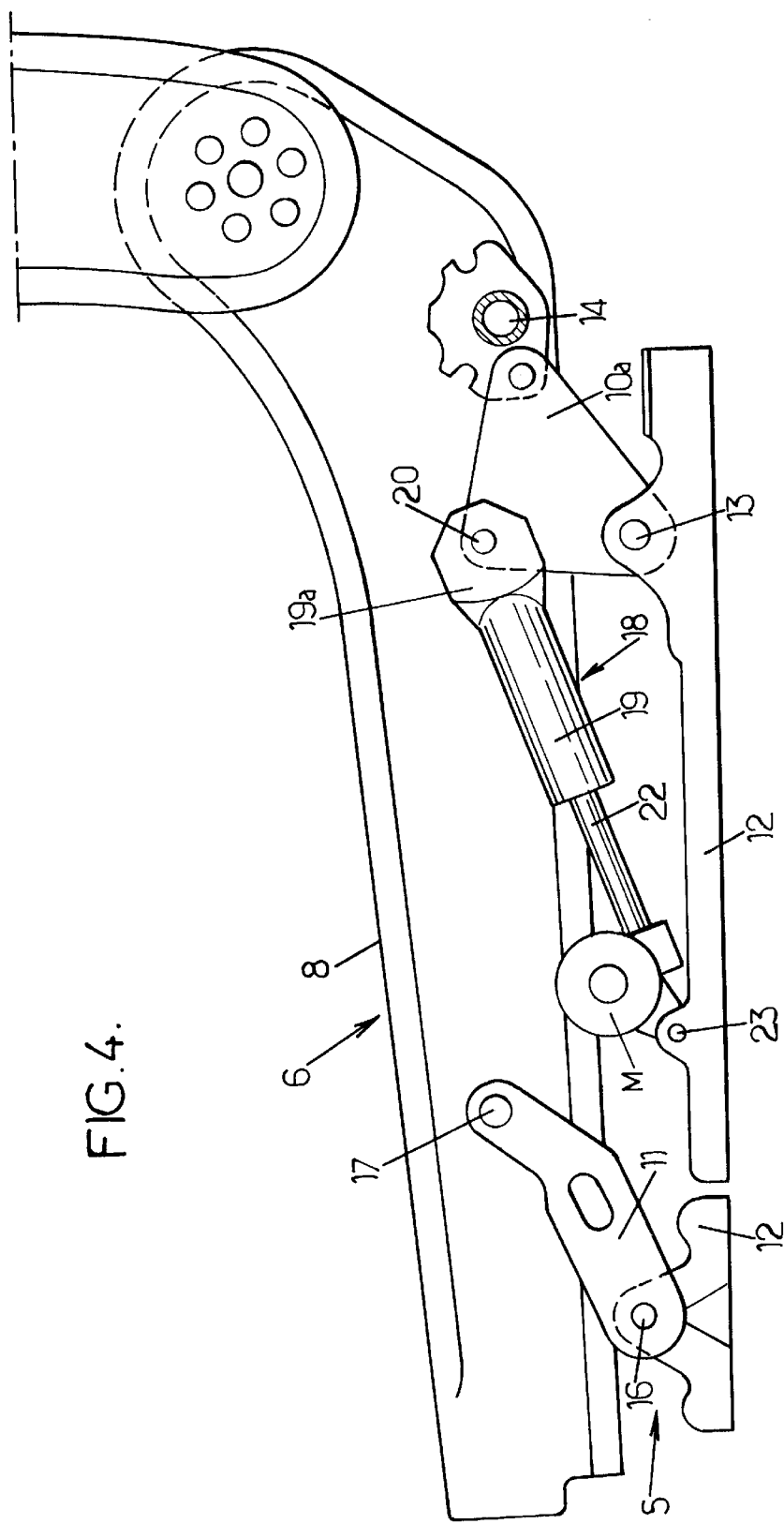
FIG. 4 is a view similar to FIG. 3, the rigid frame being in its low position.
Figure 8:
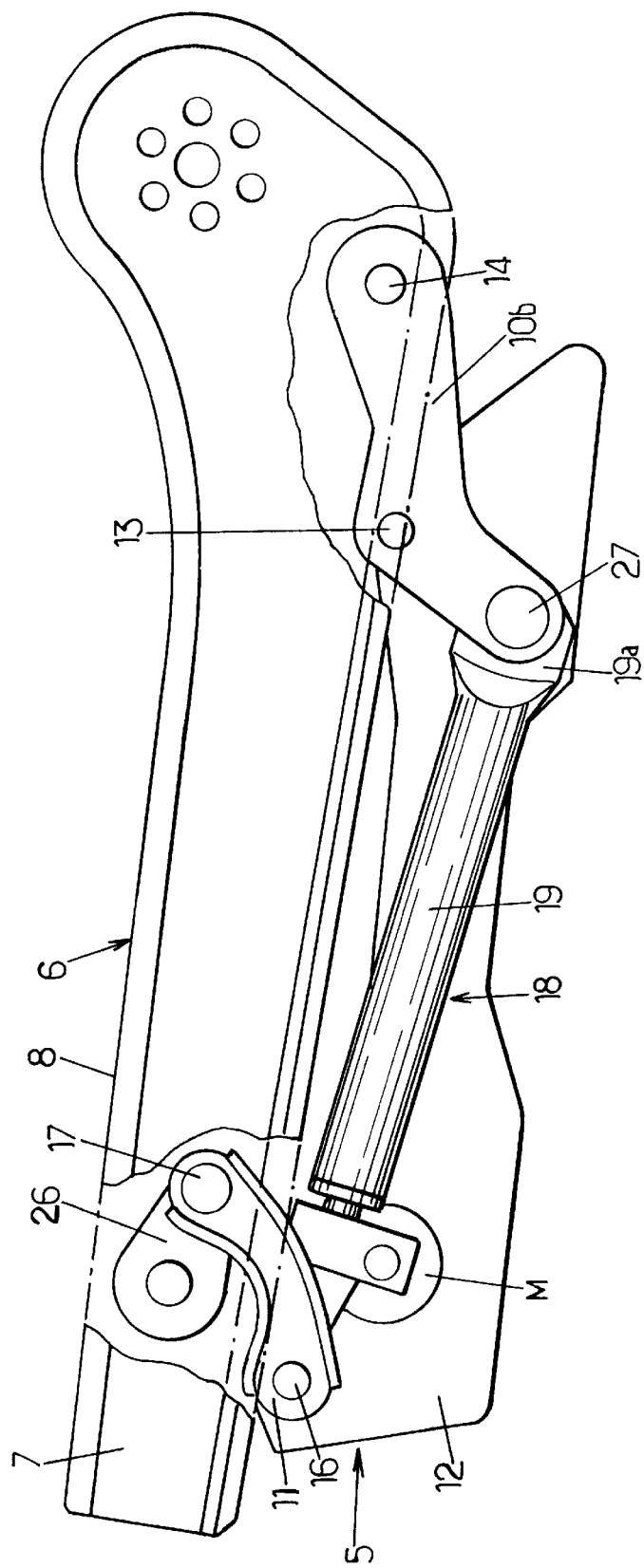
FIG. 8 is a view similar to FIG. 7 showing the rigid frame in its low position.

As can be seen in FIGS. 2 to 4, the rigid frame 6 is supported by the raising mechanism 5 which comprises:

at least two supports 12 placed on either side of the seat, each beneath a respective side plate 8, with each support 12 being fixed to the corresponding runner 4 or directly to the floor 4a of the vehicle;

two rear links 10 and 10a placed on either side of the seat and each mounted to pivot firstly on the corresponding support 12 about a bottom pivot 13 and secondly to the corresponding side plate 8 about a top pivot 14, the two bottom pivots 13 having a common pivot axis, and the two top pivots 14 being disposed in a tubular bar 15 so as to hold the rear ends of the side plates 8 at a constant distance apart, said top pivots 14 also sharing a common pivot axis; and two front links 11 placed on either side of the seat and each connected firstly to a corresponding support 12 by means of a bottom pivot 16 and secondly to the corresponding side plate 8 by means of a top pivot 17, the two bottom pivots 16 sharing a common pivot axis and the two top pivots 17 likewise sharing a common pivot axis.

The four links 10, 10a, and 11 pivot in vertical planes that are parallel to the longitudinal direction.

As shown in FIG. 4 which shows the rigid frame 6 of the seat 2 in its low position, the links 10 and 11 extend upwards and rearwards from their respective bottom pivots, whereas in FIG. 3 which shows the rigid frame in its maximally raised position, said links slope at a greater angle relative to the horizontal, i.e. they are closer to the vertical.

The raising mechanism 5 is controlled by means of an electrical actuator 18 which enables the height of the rigid frame 6 of the seat to be adjusted.

This actuator 18 comprises a tube 19 which extends between a first end 19a pivotally mounted to a rear link 10a by means of a pivot 20, and a second end 19b which is opened and which has a nut 21 fixed therein (see FIGS. 5 and 6). The actuator also comprises a screw 22 which extends between an end 22a rotated by an electric motor M and a second end 22b that is free and situated inside the tube 19, said screw 22 of the actuator co-operating with the nut 21 to move inside the tube 19.

As can be seen in FIGS. 2 to 4, the electric motor M is also pivotally mounted to the corresponding support 12 by means of a pivot 23. The respective pivots 20 and 23 at the end 19a of the tube 19 and at the motor M represent pivot axes parallel to the top and bottom pivot axes of the links 10, 10a, and 11.

The link 10a is substantially triangular in shape having three vertices respectively receiving the pivots 13, 14, and 20 connecting said link to the rigid frame 6, to the actuator 18, and to the corresponding support 12.

In the example shown in FIGS. 2 to 4, the actuator 18 retracts in order to move the rigid frame upwards. Thus, in order to bring the links 10 and 11 into their substantially vertical position, the screw 22, which is prevented from moving in translation relative to the motor M, enters progressively into the inside of the tube 19 by co-operating with the nut 21 so that the end 19a of said tube exerts a traction force tending to raise the link 10a. It will be understood that the traction force exerted by the end 19a of the tube 19 is the result of traction forces exerted by the thread of the screw 22 on the tapping in the nut 21. In order to assist the electric motor M of the actuator 18 while it is raising the rigid frame 6, in particular when a user 26 (FIG. 1) is sitting on the seat, an elastically-deformable member constituted by a compression spring 24 is placed inside the tube 19, or more precisely inside an annular chamber defined between the screw 22 and the tube 19 of the actuator 18. As can be seen in FIGS. 5 and 6, this helical compression spring 24 is placed between the nut 21 and the free end 22b of the screw 22 which is provided for this purpose with a washer 25 against which the compression spring 24 bears in abutment.

Thus, the traction forces exerted by the thread of the screw 22 against the tapping in the nut 21 while the rigid frame 6 is being raised, and which generate high levels of friction, are compensated at least in part by the action of the compression spring 24 attempting to urge the free end 22b of the spring 22 away from the nut 21.

This reduction in the friction forces between the nut 21 and the screw 22 while moving the rigid frame 6 of the seat upwards thus serves to provide assistance to the motor M of the actuator 18 without generating additional forces on the links, thereby avoiding any risk of vibration phenomena in the raising mechanism due in particular to the vehicle running.

Similarly, while the rigid frame 6 is being lowered to its lowest position, the screw 22 moves progressively out from the tube 19, thereby compressing the spring 24 against the nut 21 and thus also serving to reduce the friction forces between the nut 21 and the screw 22, and thus assisting the motor M of the actuator.

In order to avoid any risk of the compression spring 24 being damaged while the rigid frame 6 is being lowered, the actuator also has a tubular member 24A disposed directly in the tubular housing formed between the screw 22 and the tube 19. This tubular member 24A surrounds the screw 22 and has a first end fixed to the nut 21 and a second end for coming into contact against the washer 25 at the free end 22b of the screw 22 when the rigid frame 6 is in its lowest position.

In a variant embodiment of the invention as shown in FIGS. 7 to 10, the actuator 18 is designed to work in extension while the rigid frame 6 is being moved upwards.

The electric motor M of the actuator 18 is pivotally mounted to the support 12 by means of the bottom pivot 16 of one of the front links 11. The front links 11 are also mounted to pivot on the corresponding side plates 8 by means of the top pivot 17 and a support member 26 fixed to said corresponding side plate.

The first end 19a of the tube 19 is also mounted to pivot on one of the two rear links 10b by means of a pivot 27 situated on a portion of the link which extends beyond the bottom pivot 13 connecting said link 10b to the support 12. By way of example, the pivot 27 can be mounted on the tube 19 and the rear link 10b by means of a washer and a nut.

Thus, to bring the links 11 and 10 into their substantially vertical position (FIG. 7), the screw 22 which is prevented from moving in translation relative to the motor M is extended progressively from the tube 19 by co-operating with the nut 21 so that the end 19a of said tube 19 exerts a thrust force tending to raise the link 10b.

In this variant embodiment in which the thread on the screw 22 exerts thrust forces on the tapping in the nut 21 while the frame 6 is being moved upwards or downwards, the compression spring 24 is disposed between the free end 22b of the screw 22 and the far end of the tube 19 (FIGS. 9 and 10). Thus, the compression spring 24 attempts to move the free end 22b of the screw 22 towards the nut 21, thus reducing friction forces between them and assisting the motor M while lowering or raising the rigid frame 6.

The free end 22b of the screw 22 is also provided with a washer 25 against which the compression spring 24 comes to bear.

In addition, the free end 22b of the screw is provided with an abutment member 29 so as to prevent said free end 22b from engaging in the nut 21.

Advantageously, this abutment member 29 is constituted by a semi-rigid material serving to damp abutment contact when the rigid frame 6 reaches its lowest position.

As can be seen in FIG. 10, the end wall of the tube 19 is constituted by a washer 30 placed inside the tube 19 and the end 19a of said tube is advantageously made by stamping the tube, with this flattened end portion 19a subsequently being punched to provide an orifice for receiving the pivot 27.

The actuator 18 can also have a second helical compression spring 28 disposed in the cylindrical housing defined by the washer 25 at the free end of the screw 22 and the washer 30. This second spring 28 is placed concentrically around the first compression spring 24.

The compression springs 24 and 28 are dimensioned as a function of the assistance they need to deliver to the electric motor M of the actuator 18, as a function of the inside volume of the tube 19, and as a function of the stroke of the screw 22 for bringing the rigid frame into its lowest and highest positions.

Thus, in the invention, when the inside volume of the tube 19 is not sufficient for receiving a compression spring, then the spring is advantageously replaced by an elastomer type material selected as a function of the above-mentioned criteria.

We claim:

1. A vehicle seat comprising a back and a seat proper which extends in a longitudinal direction between a rear end close to the back and a front end remote from the back, said seat proper comprising a rigid frame supported by a raising mechanism for moving the seat proper upwards or downwards, the raising mechanism being controlled by an actuator comprising a tube having a nut fixed at one end thereof and having a screw rotated by a motor and co-operating with the nut, the screw of the actuator being provided with a free end situated inside the tube of the actuator, the raising mechanism further comprising an elastically-deformable member for assisting the motor of the actuator while moving the rigid frame upwards, wherein said elastically-deformable member is housed inside the tube of the actuator between the free end of the screw of the actuator and a support element secured to the tube of the actuator.

2. A vehicle seat according to claim 1, in which the elastically-deformable member operates in compression to urge the free end of the screw away from the support element.

3. A vehicle seat according to claim 1, in which the raising mechanism comprises at least four links distributed as a pair of front links and a pair of rear links, which links pivot in vertical planes parallel to the longitudinal direction when the raising mechanism is in operation, the two links of each pair of links being supported respectively by bottom pivots sharing common pivot axes, the bottom pivots being connected to supports for connecting to the floor of the vehicle, and these two links being connected respectively to the rigid frame via top pivots which likewise share common pivot axes, said actuator having a first end connected to one of the links of the raising mechanism and a second end connected to the support.

4. A vehicle seat according to claim 1, in which the actuator is designed to work in retraction during upward displacement of the rigid frame, and the support element is constituted by the nut of the actuator tube, the elastically-deformable member being disposed in an annular housing defined by the screw of the actuator and the tube of the actuator, and said elastically-deformable member being compressed between the nut of the tube and the free end of the screw of the actuator.

5. A vehicle seat according to claim 4, in which the actuator is provided with an abutment member for limiting the stroke of the actuator screw during downward displacement of the rigid frame.

6. A vehicle seat according to claim 5, in which the abutment member is constituted by a tubular member placed in the annular housing and surrounding a portion of the actuator screw, the tubular member having a first end connected to the nut of the tube and a second end for coming into contact with the free end of the actuator screw.

7. A vehicle seat according to claim 1, in which the actuator is designed to operate in extension during upward movement of the rigid frame, and the support element is constituted by an end wall of the tube cooperating with the free end of the actuator screw to define a cylindrical housing in which the elastically-deformable member is disposed.

8. A vehicle seat according to claim 1, in which the elastically-deformable member is constituted by a first compression spring.

9. A vehicle seat according to claim 7, in which the free end of the actuator screw includes an abutment member for coming into abutment against the nut of the actuator tube.

10. A vehicle seat according to claim 7, in which the elastically-deformable member is constituted by a first compression spring.

11. A vehicle seat-according to claim 10, in which an additional compression spring is placed in the cylindrical housing concentrically with the first compression spring.

* * * * *